(12) United States Patent
Kim et al.

(10) Patent No.: US 11,495,847 B2
(45) Date of Patent: Nov. 8, 2022

(54) SECONDARY BATTERY AND DEVICE INCLUDING THE SAME

(71) Applicant: LG CHEM, LTD., Seoul (KR)

(72) Inventors: Hyoung Kwon Kim, Daejeon (KR); Jeeeun Kim, Daejeon (KR); Hayoung Heo, Daejeon (KR); Duk Hyun Ryu, Daejeon (KR); Pil Kyu Park, Daejeon (KR); Namwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 63 days.

(21) Appl. No.: 16/978,456

(22) PCT Filed: Sep. 11, 2019

(86) PCT No.: PCT/KR2019/011877
§ 371 (c)(1),
(2) Date: Sep. 4, 2020

(87) PCT Pub. No.: WO2020/111469
PCT Pub. Date: Jun. 4, 2020

(65) Prior Publication Data
US 2021/0050637 A1 Feb. 18, 2021

(30) Foreign Application Priority Data
Nov. 30, 2018 (KR) .................. 10-2018-0152911

(51) Int. Cl.
*H01M 10/6551* (2014.01)
*H01M 10/613* (2014.01)
(Continued)

(52) U.S. Cl.
CPC ... *H01M 10/6551* (2015.04); *H01M 10/0431* (2013.01); *H01M 10/613* (2015.04);
(Continued)

(58) Field of Classification Search
CPC ........ H01M 10/6551; H01M 10/0431; H01M 10/613; H01M 10/625; H01M 10/653;
(Continued)

(56) References Cited

U.S. PATENT DOCUMENTS

2002/0061436 A1* 5/2002 Inagaki ............. H01M 10/0431
429/120
2004/0161662 A1 8/2004 Kim et al.
(Continued)

FOREIGN PATENT DOCUMENTS

CN 106847767 A 6/2017
CN 208127333 * 11/2018
(Continued)

OTHER PUBLICATIONS

Extended European Search Report for European Application No. 19889810.8, dated Mar. 29, 2021.
(Continued)

*Primary Examiner* — Lisa S Park
(74) *Attorney, Agent, or Firm* — Birch, Stewart, Kolasch & Birch, LLP

(57) ABSTRACT

A secondary battery is provided. The secondary battery includes an electrode assembly including a negative electrode sheet, a positive electrode sheet, and a separation membrane; and a heat radiation tape disposed at an external circumferential surface of the electrode assembly. The heat radiation tape includes a heat diffusion layer, and the heat diffusion layer includes at least one of graphite and a metal foil.

16 Claims, 8 Drawing Sheets

(51) Int. Cl.
*H01M 10/04* (2006.01)
*H01M 10/625* (2014.01)
*H01M 10/653* (2014.01)
*H01M 50/538* (2021.01)

(52) U.S. Cl.
CPC ....... *H01M 10/625* (2015.04); *H01M 10/653* (2015.04); *H01M 50/538* (2021.01); *H01M 2220/20* (2013.01)

(58) Field of Classification Search
CPC ........... H01M 50/538; H01M 2220/20; H01M 10/623; H01M 50/202; H01M 10/04; H01M 10/643; H01M 10/6553; H01M 10/655; Y02P 70/50; Y02E 60/10
See application file for complete search history.

(56) References Cited

U.S. PATENT DOCUMENTS

| | | | |
|---|---|---|---|
| 2006/0147793 | A1 | 7/2006 | Kim et al. |
| 2007/0154787 | A1 | 7/2007 | Jang et al. |
| 2008/0254348 | A1 | 10/2008 | Hatta |
| 2010/0104935 | A1 | 4/2010 | Hermann et al. |
| 2010/0255357 | A1 | 10/2010 | Baek et al. |
| 2011/0171521 | A1* | 7/2011 | Sohn .................. H01M 10/654 429/175 |
| 2011/0274951 | A1 | 11/2011 | Yasui et al. |
| 2012/0115003 | A1* | 5/2012 | Park .................. H01M 10/647 429/120 |
| 2014/0134461 | A1 | 5/2014 | Inoue et al. |
| 2014/0141338 | A1 | 5/2014 | Kim |
| 2016/0006070 | A1* | 1/2016 | Sohn .................. H01M 50/183 429/127 |
| 2016/0322626 | A1* | 11/2016 | Okuda ............... H01M 50/531 |
| 2017/0115074 | A1 | 4/2017 | Cheng |
| 2017/0309871 | A1* | 10/2017 | Jo .................... H01M 10/0436 |
| 2018/0083311 | A1* | 3/2018 | Kim .......................... C09J 7/10 |
| 2019/0173064 | A1 | 6/2019 | Lee et al. |

FOREIGN PATENT DOCUMENTS

| | | |
|---|---|---|
| CN | 208127333 U | 11/2018 |
| JP | 3416158 B2 | 6/2003 |
| JP | 2007-184238 A | 7/2007 |
| JP | 2011-249015 A | 12/2011 |
| JP | 4900534 B2 | 3/2012 |
| JP | 2012-216410 A | 11/2012 |
| JP | 2016-219368 A | 12/2016 |
| JP | 2017-82331 A | 5/2017 |
| JP | 2017123212 * | 7/2017 |
| JP | 2017-168225 A | 9/2017 |
| KR | 10-0509606 B1 | 8/2005 |
| KR | 10-2008-0092871 A | 10/2008 |
| KR | 10-2009-0008060 A | 1/2009 |
| KR | 10-2011-0137905 A | 12/2011 |
| KR | 10-2014-0064168 A | 5/2014 |
| KR | 10-2016-0002176 A | 1/2016 |
| KR | 10-2017-0084699 A | 7/2017 |
| KR | 10-2018-0081235 A | 7/2018 |

OTHER PUBLICATIONS

International Search Report issued in PCT/KR2019/011877 (PCT/ISA/210), dated Jan. 3, 2020.

* cited by examiner

SECONDARY BATTERY AND DEVICE INCLUDING THE SAME

CROSS-REFERENCE TO RELATED APPLICATION

This application claims priority to and the benefit of Korean Patent Application No. 10-2018-0152911 filed in the Korean Intellectual Property Office on Nov. 30, 2018, the entire contents of which are incorporated herein by reference.

Technical Field

The present invention relates to a secondary battery and a device including the same. More particularly, the present invention relates to a secondary battery including an electrode assembly, and a device including the same.

Background Art

In recent years, as the demand for portable electronic products such as notebook computers, video cameras, and mobile phones has been rapidly increasing, and electric vehicles, energy storage batteries, robots, satellites, etc. have been developed in earnest, a secondary battery used as a driving power source thereof has been actively researched and studied.

Such a secondary battery may for example include a nickel cadmium battery, a nickel hydrogen battery, a nickel zinc battery, a lithium secondary battery, and the like. Among them, a lithium secondary battery has been widely used in the field of high-tech electronic devices because it has almost no memory effect compared with the nickel-based secondary battery, is freely charged and discharged, and has a very low self-discharge rate, a high operating voltage, and high energy density per unit weight.

Generally, a lithium secondary battery has a structure in which unit cells configured of a positive electrode, a negative electrode, and a separation membrane interposed therebetween are stacked or wound, it is embedded in a case of a metal can or laminate sheet, and an electrolyte solution is injected or impregnated therein.

An electrode assembly of a positive electrode/separation membrane/negative electrode structure configuring the secondary battery is mainly divided into a jelly-roll type (wound type) and a stack type (stacked type) according to its structure. The jelly-roll type is a structure obtained by interposing a separation membrane between long sheet-type positive and negative electrodes coated with an active material and then winding it, and a stack type is a structure in which a plurality of positive and negative electrodes with a predetermined size are sequentially stacked in a state in which a separation membrane is interposed therebetween.

Recently, in order to implement a high power and high-capacity model, used components are becoming thin membranes, and as a result, secondary batteries with low resistance and high-capacity are increasing. However, as the resistance is lowered and the capacity is increased, a larger current is applied for a longer time, and therefore a problem of heat generation of the electrode tab due to an external short circuit has become a more important problem.

Heat generated inside the secondary battery is concentrated on the electrode tab, and particularly the negative electrode tab, because the electrode characteristics inside the cell are not uniform. As a result, there is a temperature deviation inside the secondary battery, so that a balance deterioration in the battery cell occurs, which may be connected to a performance deterioration of the secondary battery.

DISCLOSURE

Technical Problem

An object of the exemplary embodiments of the present invention is to solve the above problems, to provide a secondary battery that may effectively control heat generation inside the secondary battery and reduce the temperature deviation.

Technical Solution

A secondary battery according to an exemplary embodiment of the present invention includes: an electrode assembly including a negative electrode sheet, a positive electrode sheet, and a separation membrane; and a heat radiation tape disposed at an external circumferential surface of the electrode assembly, wherein the heat radiation tape includes a heat diffusion layer, and the heat diffusion layer includes at least one selected from the group consisting of graphite and a metal foil.

The graphite may include at least one selected from the group consisting of natural graphite and artificial graphite.

The metal foil may include at least one selected from the group consisting of Cu and Al.

The electrode assembly may be an electrode assembly of a jelly-roll type in which the separation membrane is interposed and wound between the negative electrode sheet and the positive electrode sheet, an electrode tab may be attached to the external circumferential surface of the electrode assembly, and the electrode tab may be disposed between at least a portion of the heat radiation tape and the external circumferential surface of the electrode assembly.

At least a portion of the heat radiation tape may be in contact with the electrode tab attached to the external circumferential surface of the electrode assembly.

The electrode tab may be a negative electrode tab.

The heat radiation tape may further include an adhesive layer, and the adhesive layer may be disposed between the electrode tab and the heat diffusion layer and between the external circumferential surface of the electrode assembly and the heat diffusion layer.

The heat radiation tape may further include an adhesive layer, the adhesive layer may be disposed between the external circumferential surface of the electrode assembly and the heat diffusion layer, and at least a portion of the electrode tab may be in direct contact with the heat diffusion layer.

The separation membrane includes a finishing portion at an outermost end thereof, the finishing portion defining at least a portion of the external circumferential surface of the electrode assembly, and at least a portion of the heat radiation tape may be adhered to the finishing portion.

A thickness of the heat diffusion layer may be from 17 μm to 1 mm.

The heat diffusion layer may have a sheet shape, and heat is transferred in a direction parallel to the heat diffusion layer.

The heat radiation tape may include an adhesive layer and a base layer, and the heat diffusion layer may be disposed between the adhesive layer and the base layer.

The base layer may include at least one selected from the group consisting of polyimide and polyethylene terephthalate.

A thickness of the adhesive layer may be from 5 μm to 25 μm, and a thickness of the base layer may be from 5 μm to 25 μm.

A positive electrode tab may be disposed on a center part of the electrode assembly.

A device according to an exemplary embodiment of the present invention may include a secondary battery described above as a power source.

Advantageous Effects

According to the exemplary embodiments of the present invention, as the shape of the electrode assembly may not only be maintained through the heat radiation tape disposed at the external circumferential surface of the electrode assembly, but also heat locally generated in the secondary battery may be rapidly diffused, and the temperature deviation inside the secondary battery may be reduced, thereby preventing the performance deterioration due to the temperature imbalance.

MODE FOR INVENTION

Figure 1:
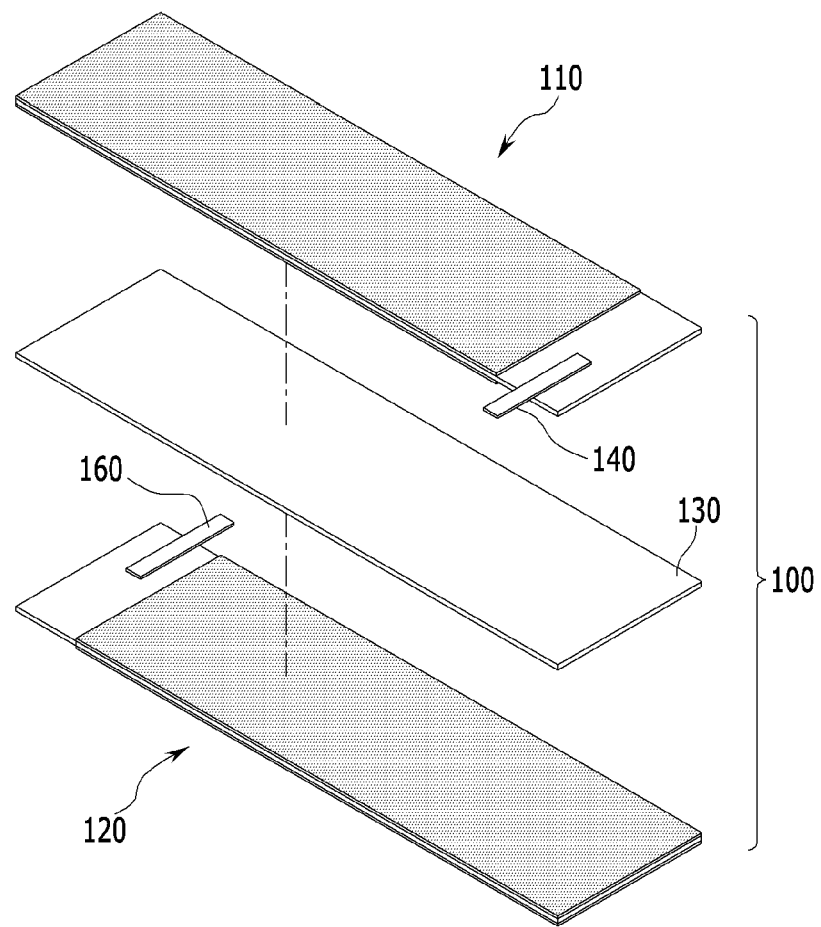
FIG. 1 is an exploded perspective view of an electrode assembly before being wound according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, a portion that is not directly related to the present invention was omitted, and the same reference numerals are attached to the same or similar constituent elements through the entire specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, but does not essentially mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Throughout the specification, the phrase "on a plane" means viewing the object portion from the top, and the phrase "on a cross-section" means viewing a cross-section of which the object portion is vertically cut from the side.

Figure 2:
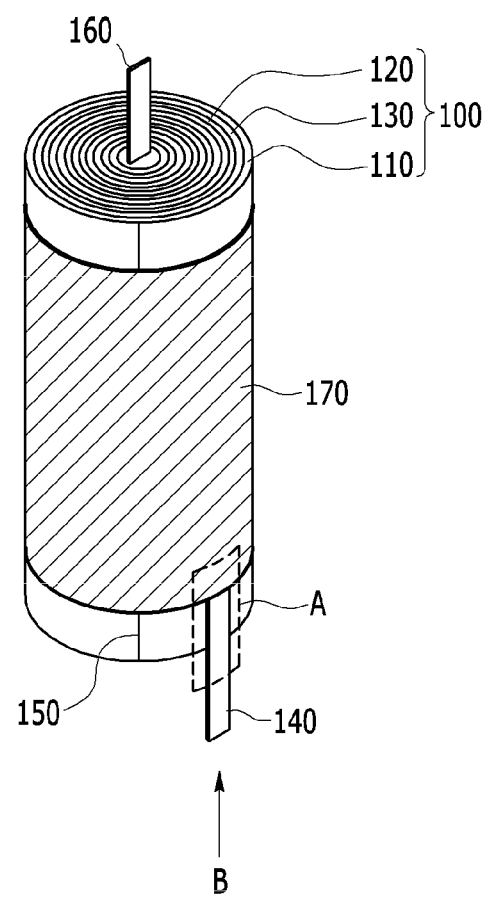
FIG. 2 is a perspective view of an electrode assembly of FIG. 1 after being wound.

FIG. 1 is an exploded perspective view of an electrode assembly before being wound according to an exemplary embodiment of the present invention, and FIG. 2 is a perspective view of an electrode assembly of FIG. 1 after being wound.

Referring to FIG. 1 and FIG. 2, a secondary battery according to an exemplary embodiment of the present invention includes: an electrode assembly 100 including a negative electrode sheet 110, a positive electrode sheet 120, and a separation membrane 130; and a heat radiation tape 170 disposed on an external circumferential surface of the electrode assembly 100, wherein the heat radiation tape 170 includes a heat diffusion layer, and the heat diffusion layer includes at least one of graphite and a metal foil. The heat diffusion layer is described later.

The heat radiation tape 170 in FIG. 2 is shown to be spaced apart from the top and bottom of the external circumferential surface of the electrode assembly 100, but this is for convenience of description, and it may be disposed to surround the entire external circumferential surface of the electrode assembly 100.

The electrode assembly 100 is a jelly-roll type of electrode assembly 100 that is wound while interposing the separation membrane 130 between the negative electrode sheet 110 and the positive electrode sheet 120, an electrode tab may be attached to the external circumferential surface of the electrode assembly 100, and the electrode tab may be disposed between at least a portion among the heat radiation tape 170 and the external circumferential surface of the electrode assembly 100.

The electrode tabs 140 and 160 respectively include a negative electrode tab 140 attached to the negative electrode sheet 110 and a positive electrode tab 160 attached to the positive electrode sheet 120. FIG. 2 shows that the negative electrode tab 140 is attached to the external circumferential surface of the electrode assembly 100 to be disposed between at least a portion among the heat radiation tape 170 and the external circumferential surface of the electrode assembly 100, and the positive electrode tab 160 is disposed on the center part of the electrode assembly 100. However, the positive electrode tab 160 may be attached to the external circumferential surface of the electrode assembly 100 and the negative electrode tab 140 may be disposed at the center part of the electrode assembly 100. Also, although not shown, at least one of the positive electrode tab and the negative electrode tab may be additionally attached for a high power model.

In the secondary battery of the high power and high-capacity model, when a large current flows in a short time due to a high rate discharge, an overcharge, an external short circuit, etc., a large amount of heat is generated in the electrode tab, particularly at the negative electrode tab 140, due to the current concentration. Since the secondary battery is constantly repeatedly charged or discharged by an internal electrochemical reaction, when the secondary battery becomes high-capacity, the heat generated by the charge and discharge increases dramatically. Due to such heat generation, the separation membrane 130 may be damaged and lead to an internal short circuit, and may also lead to a performance deterioration of the secondary battery by causing a temperature deviation inside the secondary battery.

Since the heat radiation tape 170 includes a heat diffusion layer having an excellent heat conduction characteristic to be intended to solve such a problem, and since heat locally generated inside the secondary battery may be rapidly diffused to prevent the temperature from increasing, additionally, the temperature deviation inside the secondary battery may be reduced to prevent the performance deterioration due to the temperature imbalance.

Specifically, the negative electrode tab 140 generates the greatest heat generation in the case of the negative electrode tab 140, which has particularly high resistance among the internal constituent elements of the secondary battery, the negative electrode tab 140 is generally attached to the external circumferential surface of the electrode assembly 100 rather than the positive electrode tab 160. Accordingly, particularly through the structure in which at least a portion of the heat radiation tape 170 is in contact with the negative electrode tab 140 attached to the external circumferential surface of the electrode assembly 100, heat generated in the negative electrode tab 140 may be effectively diffused.

Also, again referring to FIG. 2, at least a portion of the heat radiation tape 170 may be attached to a finishing portion 150 of the external circumferential surface of the electrode assembly 100, and the finishing portion 150 may be disposed at the outermost end of the separation membrane 130. Since at least a portion of the heat radiation tape 170 squeezes the electrode assembly 100 while being adhered to the finishing portion 150, it maintains the shape of the wound electrode assembly 100 and prevents the electrode assembly 100 from being loosened by an internal stress.

Hereinafter, for convenience of explanation in FIG. 3 to FIG. 7, it is described based on an example in which the negative electrode tab of the electrode tab is attached to the external circumferential surface of the electrode assembly, but the scope is not limited thereto, and it also applies to the positive electrode tab being attached to the external circumferential surface of the electrode assembly.

Figure 3:
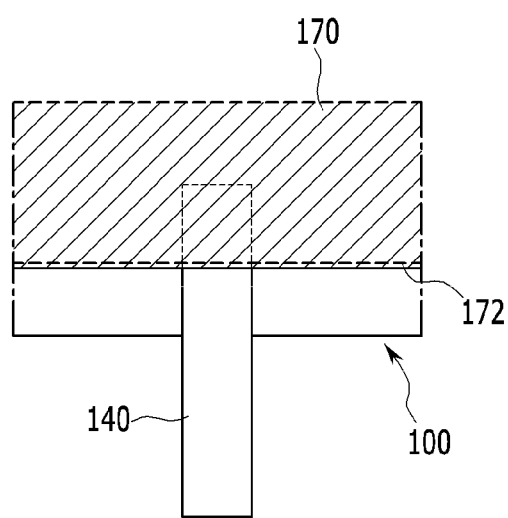
FIG. 3 is an enlarged partial view of a portion A of FIG. 2.
Figure 4:
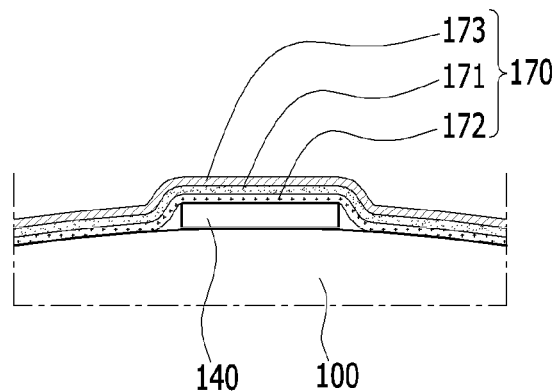
FIG. 4 is a partial view in viewing in a direction B of FIG. 2.

FIG. 3 is an enlarged partial view of a portion A of FIG. 2, and FIG. 4 is a partial view in viewing in a direction B of FIG. 2.

Referring to FIG. 3 and FIG. 4, the heat radiation tape 170 according to an exemplary embodiment of the present invention may include a base layer 173, a heat diffusion layer 171, and an adhesive layer 172. The adhesive layer 172 may be disposed between the negative electrode tab 140 and the heat diffusion layer 171, and between the external circumferential surface of the electrode assembly 100 and the heat diffusion layer 171. The heat diffusion layer 171 may be fixedly disposed on the negative electrode tab 140 and the external circumferential surface of the electrode assembly 100 through the adhesive layer 172.

Figure 5:
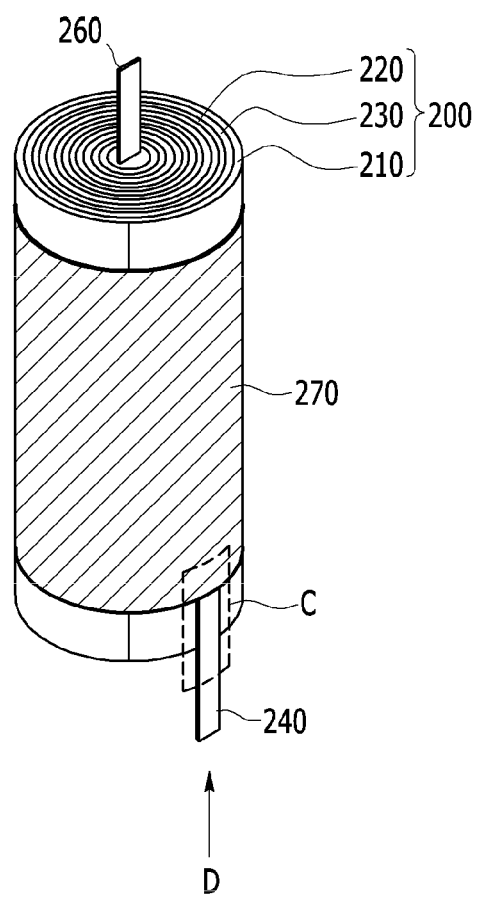
FIG. 5 is a perspective view of an electrode assembly according to an exemplary embodiment of the present invention after being wound.
Figure 6:
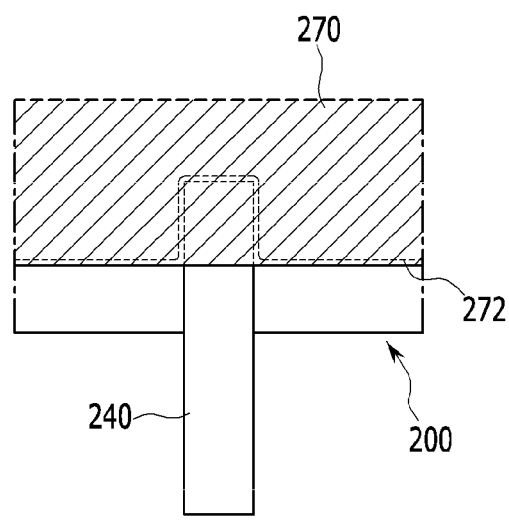
FIG. 6 is an enlarged partial view of a portion C of FIG. 5.
Figure 7:
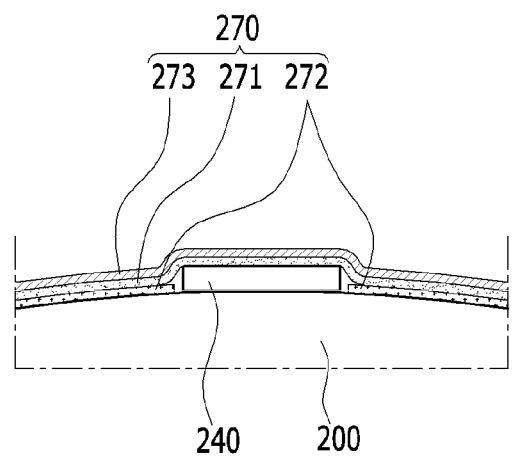
FIG. 7 is a partial view in viewing in a direction D of FIG. 5.

FIG. 5 is a perspective view of an electrode assembly according to an exemplary embodiment of the present invention after being wound, FIG. 6 is an enlarged partial view of a portion C of FIG. 5, and FIG. 7 is a partial view in viewing in a direction D of FIG. 5.

Referring to FIG. 5 to FIG. 7, a heat radiation tape 270 disposed at the external circumferential surface of an electrode assembly 200 including a negative electrode sheet 210, a positive electrode sheet 220, and a separation membrane 230 may include the base layer 273, the heat diffusion layer 271, and the adhesive layer 272. The adhesive layer 272 may be disposed between the external circumferential surface of the electrode assembly 200 and the heat diffusion layer 271, and at least a portion of the negative electrode tab 240 may be in contact with the heat diffusion layer 271. That is, through the adhesive layer 272 disposed between the external circumferential surface of the electrode assembly 200 and the heat diffusion layer 271, the heat diffusion layer 271 may not only be fixedly disposed on the negative electrode tab 240 and the external circumferential surface of the electrode assembly 200, but also at least a portion of the negative electrode tab 240 may be in direct contact with the heat diffusion layer 271 disposed directly thereon, thereby heat locally generated in the negative electrode tab 240 may be further rapidly diffused.

Although not shown, the electrode assembly according to another exemplary embodiment of the present inventions has a separation membrane extending by a certain length compared to the positive electrode sheet and the negative electrode sheet, thus winding the outermost part of the wound electrode assembly by more than one turn. In this case, the negative electrode tab may be disposed below the extended separation membrane, rather than at the outermost portion of the wound electrode assembly. Thus, the extended separation membrane may be placed between the negative electrode tab and the heat radiation tape. In this case, the electrode assembly according to the present exemplary embodiment may form the structure in which the adhesive layer is disposed between the separation membrane disposed on the negative electrode tab and the heat diffusion layer and the structure in which the separation membrane disposed on the negative electrode tab is in direct contact with the heat diffusion layer.

Again referring to FIG. 4, and FIG. 7, the heat radiation tapes 170 and 270 according to the exemplary embodiments of the present invention may respectively further include the adhesive layers 172 and 272 and the base layers 173 and 273 as well as the heat diffusion layers 171 and 271, and the heat diffusion layers 171 and 271 may be disposed between the adhesive layers 172 and 272 and the base layers 173 and 273.

The heat diffusion layers 171 and 271, as mentioned above, are to diffuse and release heat generated in any position in the secondary battery and are not particularly limited as long as the thermal conductivity is excellent, however it is preferable to include at least one of the metal foil and graphite, and the graphite may include at least one of natural graphite and artificial graphite.

Since the heat diffusion layers 171 and 271 are sheet-shaped, heat transfer is performed in a horizontal direction parallel to the heat diffusion layers 171 and 271 by a heat diffusion principle.

The thickness of the heat diffusion layers 171 and 271 is preferably 17 µm to 1 mm. Specific thicknesses for each material are described below.

The natural graphite is a material with good producibility because it is easily formed in various thicknesses and widths, and it is preferable to form the natural graphite with a thickness of 0.07 mm to 1 mm. If the thickness is less than 0.07 mm, the heat diffusion layer may be too thin such that the heat transfer may be limited, and if the thickness is greater than 1 mm, the heat diffusion effect may be reduced due to the excessive thickness, and the capacity of the secondary battery may be reduced as a side effect.

The artificial graphite is artificially produced graphite, and because it is excellent in its heat dissipation characteristic to be produced as a thin membrane, it is preferable to form the thickness of 17 μm to 40 μm. If the thickness is less than 17 μm, the heat diffusion layer may be too thin such that the heat transfer may be limited, and if the thickness is greater than 40 μm, the heat diffusion effect may be reduced due to the excessive thickness, and the capacity of the secondary battery may be reduced as a side effect.

The metal foil is a material that may form the heat diffusion layer relatively inexpensively and may include at least one of Cu and Al having high thermal conductivity, and the metal foil is preferably formed in a thickness of 25 μm to 90 μm.

The adhesive layers 172 and 272 are for fixing and positioning the heat radiation tapes 170 and 270 including the heat diffusion layers 171 and 271 to the external circumferential surface of the electrode assembly including the electrode tabs, and may include an acryl-based adhesive.

The thicknesses of the adhesive layers 172 and 272 may be from 5 μm to 25 μm. The adhesion of the heat radiation tapes 170 and 270 may be maintained when the thickness is at least 5 μm, but when the thickness is more than 25 μm, there may be a problem in that heat is not effectively diffused due to the unnecessary thickness.

The base layers 173 and 273 are foundation layers of the heat radiation tapes 170 and 270, and are not particularly limited as long as they can perform insulation and heat-resistance functions, but preferably include at least one of polyimide and polyethylene terephthalate.

The thicknesses of the base layers 173 and 273 may be 5 μm to 25 μm. The thickness of 5 μm is a minimum thickness at which the base layers 173 and 273 may exhibit insulation performance, and if the thickness is more than 25 μm, there may be a problem in that heat is not effectively diffused due to the unnecessary thickness.

Again referring to FIG. 2 and FIG. 5, the electrode assemblies 100 and 200 according to the exemplary embodiments of the present invention may be electrode assemblies 100 and 200 of the jelly-roll type by interposing the separation membranes 130 and 230 between the negative electrode sheets 110 and 210 and the positive electrode sheets 120 and 220 to be wound, respectively. Since the electrode assemblies 100 and 200 are the jelly-roll type, each bend of the negative electrode sheet 110, the positive electrode sheet 120, and the separation membrane 130 directly or indirectly in contact with the electrode tab may be damaged due to heat generated from the electrode tab. However, the electrode assembly 100 according to the exemplary embodiments of the present invention may minimize the above-described damage due to the heat diffusion effect of the heat radiation tapes 170 and 270 adhered to the external circumferential surface of the electrode assemblies 100 and 200. That is, when the heat radiation tapes 170 and 270 of the present invention are applied to the electrode assemblies 100 and 200 in the form of a jelly roll, the damage due to heat may be further minimized.

Although not shown, the secondary battery according to the exemplary embodiments of the present invention may further include a pouch-type case receiving the electrode assembly and including a laminate sheet. Unlike a conventional pouch-type secondary battery that uses the separation membrane as a finishing of the electrode assembly, in an exemplary embodiment of the present invention, the electrode assembly may be finished so as to not loosen through the heat radiation tape and simultaneously the temperature imbalance in the secondary battery may be reduced.

In addition, the secondary battery according to the exemplary embodiments of the present invention may further include a cylindrical or rectangular case in which the electrode assembly is accommodated. FIG. 2 to FIG. 7 illustrate a case in which the electrode assembly is accommodated in the cylindrical case, but the structure of the heat radiation tape and the like may be equally or similarly applied even when being accommodated in the rectangular case.

The electrode assembly described above is included in the secondary battery and may be applied to various devices. The device may be applied to a vehicle such as an electric bicycle, an electric vehicle, a hybrid vehicle, but is not limited thereto and may be applied to various devices that may use the secondary battery.

Experimental Example 1

Figure 8:
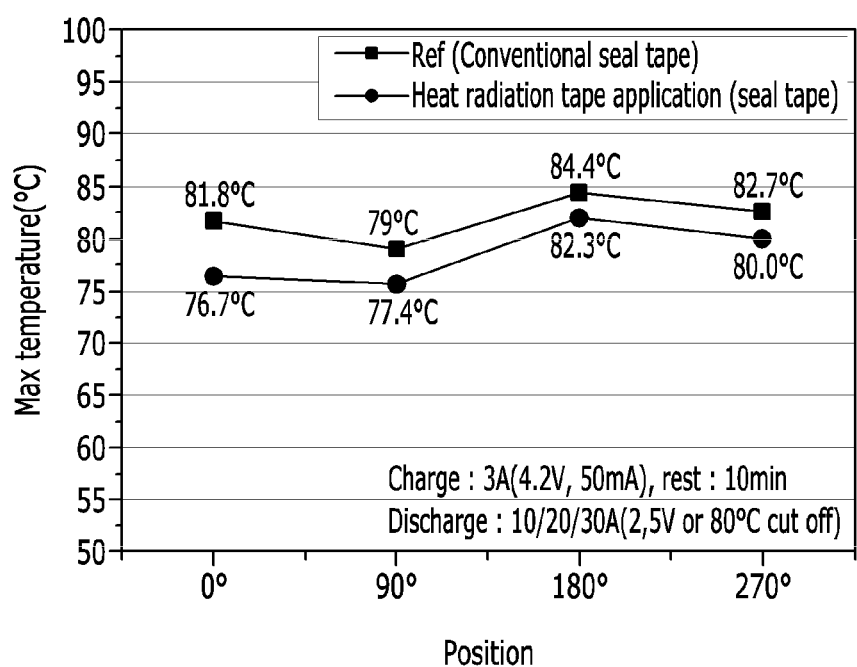
FIG. 8 is a graph for comparing a maximum temperature for each section of a secondary battery in which a heat radiation tape including a heat diffusion layer is adhered and a secondary battery in which a tape without a heat diffusion layer is adhered according to an exemplary embodiment of the present invention.

A graph for comparing a maximum temperature of each section of the secondary battery to which the heat radiation tape including the heat diffusion layer of the artificial graphite is adhered and the secondary battery to which the tape without the heat diffusion layer is adhered is shown in FIG. 8. The thickness of the heat radiation tape including the heat diffusion layer of the artificial graphite is 40 μm, and the thickness of the heat diffusion layer of artificial graphite is 25 μm.

The portion where the negative electrode tab is attached is a reference as 0°, and moves every 90° to attach a temperature line, and then a temperature is measured. Through FIG. 8, it may be confirmed that the maximum temperature is further lowered in the secondary battery to which the heat radiation tape including the heat diffusion layer is adhered according to the exemplary embodiments of the present invention compared with the secondary battery to which the tape without the heat diffusion layer is adhered. In particular, it may be confirmed that the temperature is most decreased at 0° at the portion where the negative electrode tab is attached.

Experimental Example 2

The horizontal thermal conductivity is measured for each case including the artificial graphite, the natural graphite, and the metal foil for the heat radiation tape including the heat diffusion layer according to the exemplary embodiments of the present invention and for the heat radiation tape without the heat diffusion layer and is shown in Table 1. The horizontal thermal conductivity means a thermal conductivity in a direction parallel to the heat radiation tape.

TABLE 1

| Division | Horizontal thermal conductivity (W/mK) |
| --- | --- |
| Artificial graphite | 800 |
| Natural graphite | 250 |

TABLE 1-continued

| Division | Horizontal thermal conductivity (W/mK) |
|---|---|
| Metal foil | 100-250 |
| Without heat diffusion layer | <1.0 |

Referring to Table 1, the heat radiation tape including the heat diffusion layer according to the exemplary embodiments of the present invention shows high horizontal thermal conductivity, as compared with the case without the heat diffusion layer. Therefore, it is possible to disperse heat generated inside the secondary battery more effectively, and particularly, as the heat radiation tape containing the artificial graphite or the natural graphite shows 3 to 8 times higher horizontal thermal conductivity for the case including the metal foil, to include the graphite, particularly the artificial graphite, is particularly desirable.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS 100, 200: electrode assembly
170, 270: the heat radiation tape
171, 271: heat diffusion layer

The invention claimed is:

1. A secondary battery comprising:
an electrode assembly including a negative electrode sheet, a positive electrode sheet, and a separation membrane;
an electrode tab directly attached to an external circumferential surface of the electrode assembly, and
a heat radiation tape disposed at and in direct contact with the external circumferential surface of the electrode assembly,
wherein the electrode tab is disposed between at least a portion of the heat radiation tape and the external circumferential surface of the electrode assembly,
wherein the heat radiation tape includes a heat diffusion layer, and
wherein the heat diffusion layer comprises at least one selected from the group consisting of graphite and a metal foil.

2. The secondary battery of claim 1, wherein the graphite comprises at least one selected from the group consisting of natural graphite and artificial graphite.

3. The secondary battery of claim 1, wherein the metal foil comprises at least one selected from the group consisting of Cu and Al.

4. The secondary battery of claim 1, wherein the electrode assembly is an electrode assembly of a jelly-roll type in which the separation membrane is interposed and wound between the negative electrode sheet and the positive electrode sheet.

5. The secondary battery of claim 4, wherein at least a portion of the heat radiation tape is in contact with the electrode tab attached to the external circumferential surface of the electrode assembly.

6. The secondary battery of claim 4, wherein the electrode tab is a negative electrode tab.

7. The secondary battery of claim 4, wherein the heat radiation tape further includes an adhesive layer, and
the adhesive layer is disposed between the electrode tab and the heat diffusion layer and between the external circumferential surface of the electrode assembly and the heat diffusion layer.

8. The secondary battery of claim 4, wherein the heat radiation tape further includes an adhesive layer, the adhesive layer is disposed between the external circumferential surface of the electrode assembly and the heat diffusion layer, and
at least a portion of the electrode tab is in direct contact with the heat diffusion layer.

9. The secondary battery of claim 4, wherein the separation membrane includes a finishing portion at an outermost end thereof, the finishing portion defining at least a portion of the external circumferential surface of the electrode assembly, and
at least a portion of the heat radiation tape is adhered to the finishing portion.

10. The secondary battery of claim 1, wherein a thickness of the heat diffusion layer is from 17 µm to 1 mm.

11. The secondary battery of claim 1, wherein the heat diffusion layer has a sheet shape and heat is transferred in a direction parallel to the heat diffusion layer.

12. The secondary battery of claim 1, wherein the heat radiation tape includes an adhesive layer and a base layer, and
the heat diffusion layer is disposed between the adhesive layer and the base layer.

13. The secondary battery of claim 12, wherein the base layer comprises at least one selected from the group consisting of polyimide and polyethylene terephthalate.

14. The secondary battery of claim 12, wherein a thickness of the adhesive layer is from 5 µm to 25 µm, and
a thickness of the base layer is from 5 µm to 25 µm.

15. A device comprising the secondary battery of claim 1 as a power source.

16. The secondary battery of claim 6, wherein a positive electrode tab is disposed on a center part of the electrode assembly.

* * * * *